United States Patent [19]

Carleton

[11] Patent Number: 4,812,611

[45] Date of Patent: Mar. 14, 1989

[54] GAS FLOW DEVICE FOR WELDING ELECTRODE

[75] Inventor: Samuel A. Carleton, Bath, N.Y.

[73] Assignee: North American Philips Corporation, New York, N.Y.

[21] Appl. No.: 811,625

[22] Filed: Dec. 20, 1985

[51] Int. Cl.[4] ............................................... B23K 9/16
[52] U.S. Cl. ........................................ 219/74; 219/75
[58] Field of Search ............................ 219/74, 75, 136

[56] References Cited

U.S. PATENT DOCUMENTS

| | | | |
|---|---|---|---|
| 3,875,364 | 4/1975 | Boyett | 219/74 |
| 3,969,603 | 7/1976 | Boughton et al. | 219/74 |
| 3,976,853 | 8/1976 | Trattner et al. | 219/75 |
| 4,166,940 | 9/1979 | Barger et al. | 219/74 |
| 4,233,489 | 11/1980 | Essers | 219/124.1 |

Primary Examiner—E. A. Goldberg
Assistant Examiner—Lincoln Donovan
Attorney, Agent, or Firm—John C. Fox

[57] ABSTRACT

A gas flow device for a welding electrode includes a metal sleeve to form a concentric chamber surrounding the electrode, a plastic cap enclosing the rear end of the chamber, an inert gas inlet into the chamber and a quantity of steel wool between the forward end of the chamber and the electrode.

6 Claims, 1 Drawing Sheet

GAS FLOW DEVICE FOR WELDING ELECTRODE

BACKGROUND OF THE INVENTION

This invention relates to welding electrodes, and more particularly relates to a gas flow device for directing inert gas around the electrode and onto a workpiece.

The use of inert gases in arc welding to protect the electrode tip and/or the workpieces from oxidation is well known. One of the problems encountered in open systems is the tendency of the inert gas flow to become turbulent and entrap atmospheric oxygen or even to disperse before it can be directed to the desired location. Various techniques have been proposed to deal with this problem, such as concentric sheaths around the electrode to promote laminar flow of the inert gas. See, for example, U.S. Pat. No. 4,233,489. Such arrangements have varying degrees of effectiveness and thus have met with varying degrees of success. In addition, due to their complexity, many of them tend to be cumbersome and can add considerable weight and expense to a welding tool.

It is an object of this invention to provide a gas flow device for welding electrodes which is simple of construction, easily adapted to a variety of welding arrangements, and effective in protecting both electrodes and workpieces from oxidation.

SUMMARY OF THE INVENTION

In accordance with the invention, there is provided a gas flow device for welding electrodes comprising: a metal sleeve having a forward opening and a rearward opening, the sleeve dimensioned to create a concentric chamber surrounding the tip portion of a welding electrode; an insulating cap covering the rearward opening of the sleeve and having a central aperture dimensioned to force fit onto the electrode; means for introducing an inert gas into the chamber in the vicinity of the rearward opening of the sleeve; and a quantity of metal wool to fill the portion of the chamber in the vicinity of the forward opening of the sleeve; whereby inert gas introduced into the chamber during welding is forced to flow through the wool and onto an adjacent workpiece to be welded.

In accordance with a preferred embodiment of the invention, the sleeve has a forward portion, a rearward portion, and a transition region between these portions, and the forward portion has a smaller cross-section than the rearward portion.

In accordance with another preferred embodiment, the insulating cap includes a lower plug portion dimensioned to force fit inside the rearward portion of the sleeve, and a larger upper stopper portion abutting the rearward portion of the sleeve.

BRIEF DESCRIPTION OF THE DRAWINGS

The sole FIGURE is a section view of the gas flow device of the invention, shown in working relationship with a welding electrode and a workpiece.

DESCRIPTION OF THE PREFERRED EMBODIMENTS

Figure 1:
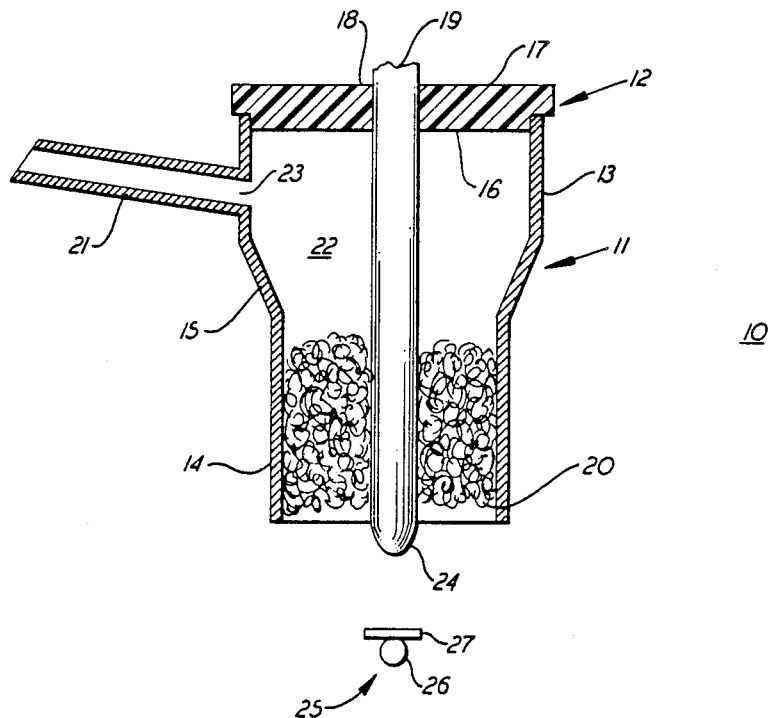

Referring to the drawing, the sole figure shows a gas flow device 10 of the invention, including sleeve 11 and cap 12. Sleeve 11 has a rearward portion 13, a smaller cross-sectioned forward portion 14, and a transition region 15 to provide a gradual transition from the rearward portion 13 to the forward portion 14.

Cap 12, of one-piece molded plastic, includes a lower plug portion 16 and an upper stopper portion 17. Plug 16 is dimensioned to force fit into the rearward portion 13 of sleeve 11. Stopper 17 is larger and retains plug 16 in place by abutting the rear edge of sleeve 11. Cap 12 defines a central aperture 18, dimensioned to force fit around welding electrode 19, thereby holding sleeve 11 in a concentric position surrounding electrode 19.

Cap 12 is preferably fabricated from a plastic material, whose natural resilience enables repeated insertions and removals of the cap from the sleeve, and from various electrodes, as well as sliding of the cap along an electrode to adjust the position of the device, for example, to compensate for consumption of the electrode during welding.

Located in the space between the forward portion 14 of sleeve 11 and electrode 19 is a quantity of metal wool 20, preferably stainless steel, held in place by the outward spring bias of the wool fibers.

Located in the rearward portion 13 of sleeve 11 is gas inlet tube 21, communicating with concentric chamber 22 via aperture 23. When inert gas, e.g., argon, is introduced under pressure into the chamber 22, it flows forward along electrode 19, through metal wool 20, and past electrode tip 24, where it surrounds workpiece 25, including pin 26 and strip 27 to be welded.

The metal wool is thought to impart a non-turbulent character to the gas flow by dispersing it in all directions, thereby substantially avoiding entrapment of atmospheric oxygen in the flow. Thus, a weld with no apparent oxidation results.

The constriction of the chamber in the forward portion 14 of the sleeve is also through to be beneficial in that it tends to concentrate the flow of gas in the vicinity of the workpiece.

As the electrode is consumed through use, the gas flow device may simply be moved further back along the electrode to maintain the desired relationship between the forward end and the electrode tip.

While there have been shown and described what are at present considered the preferred embodiments of the invention, it will be obvious to those skilled in the art that various changes and modifications may be made therein without departing from the scope of the invention as defined by the appended claims.

I claim:

1. A gas flow device for directing inert gas around a welding electrode and onto a workpiece, the device comprising: a metal sleeve having a forward opening and a rearward opening, the sleeve dimensioned to create a concentric chamber surrounding the tip portion of a welding electrode; an insulating cap covering the rearward opening of the sleeve and having a central aperture dimensioned to force fit onto the electrode; means for introducing an inert gas into the chamber in the vicinity of the rearward opening of the sleeve; and a quantity of metal wool to fill the portion of the chamber in the space between the forward portion of the sleeve and the electrode; whereby inert gas introduced into the chamber during welding is forced to flow along the electrode, through the wool and onto an adjacent workpiece to be welded.

2. The device of claim 1 in which the sleeve has a forward portion, a rearward portion, and a transition region between these portions, and the forward portion has a smaller cross section than the rearward portion.

3. The device of claim 1 in which the metal wool is stainless steel.

4. The device of claim 2 in which the insulating cap includes a lower plug portion dimensioned to force fit inside the rearward portion of the sleeve, and a larger upper stopper portion abutting the rearward portion of the sleeve.

5. The device of claim 4 in which the cap is a single piece of molded plastic material.

6. The device of claim 2 in which the means for introducing inert gas into the chamber comprises an aperture in the rearward portion of the sleeve and a gas inlet tube attached to the sleeve and extending from the aperture.

* * * * *